United States Patent Office 3,392,526
Patented July 16, 1968

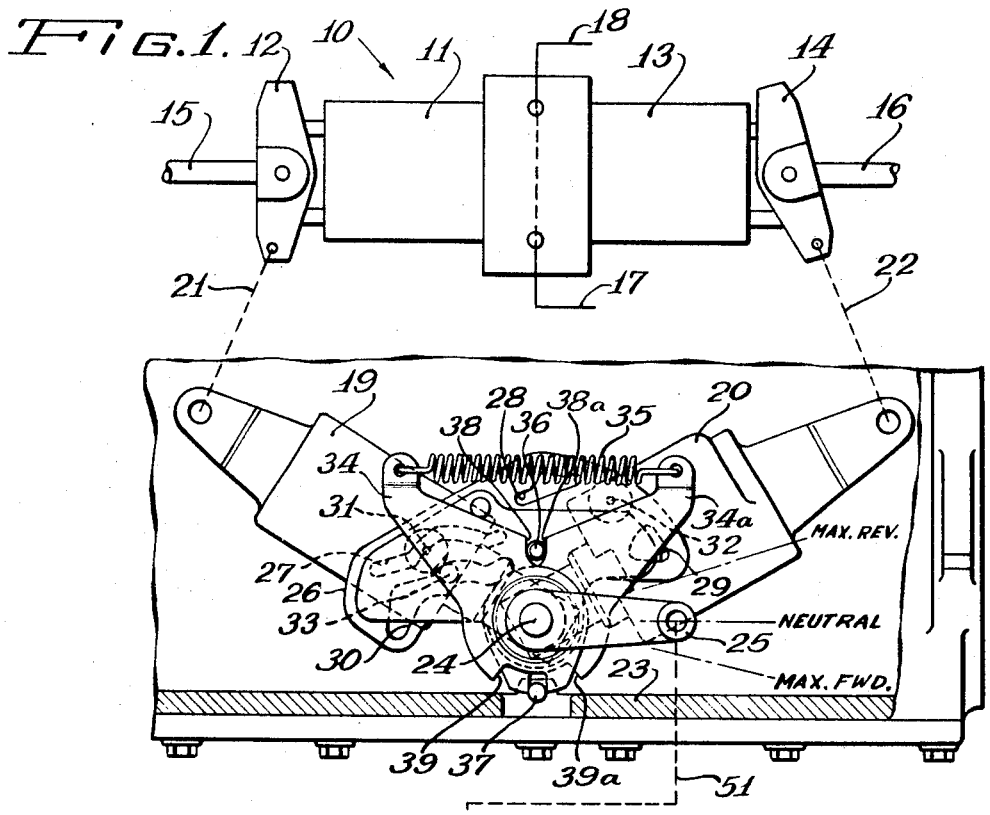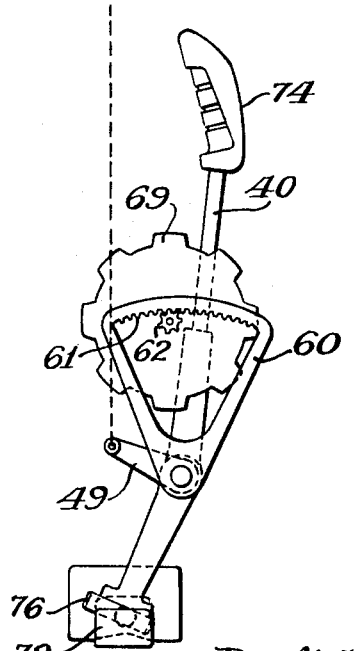

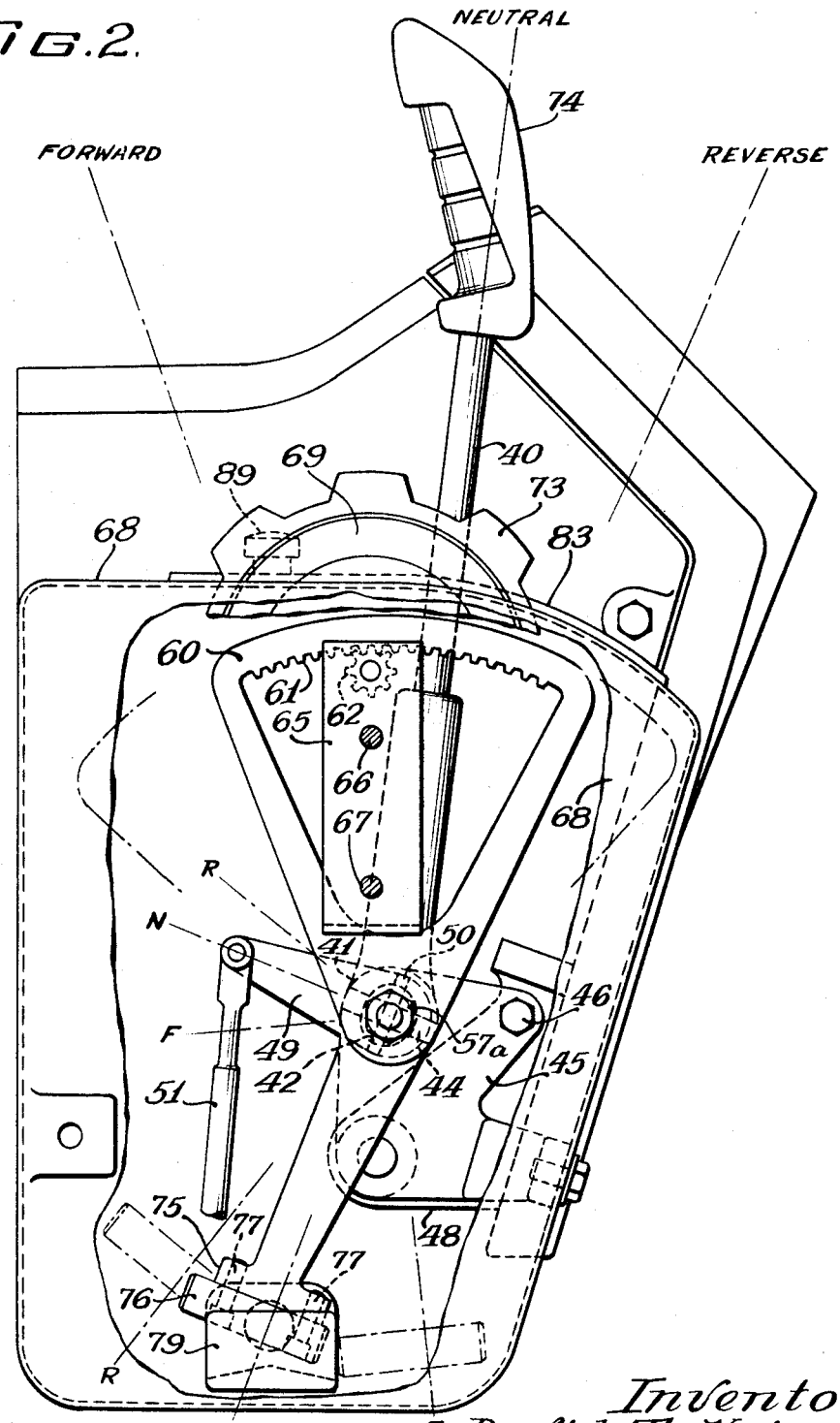

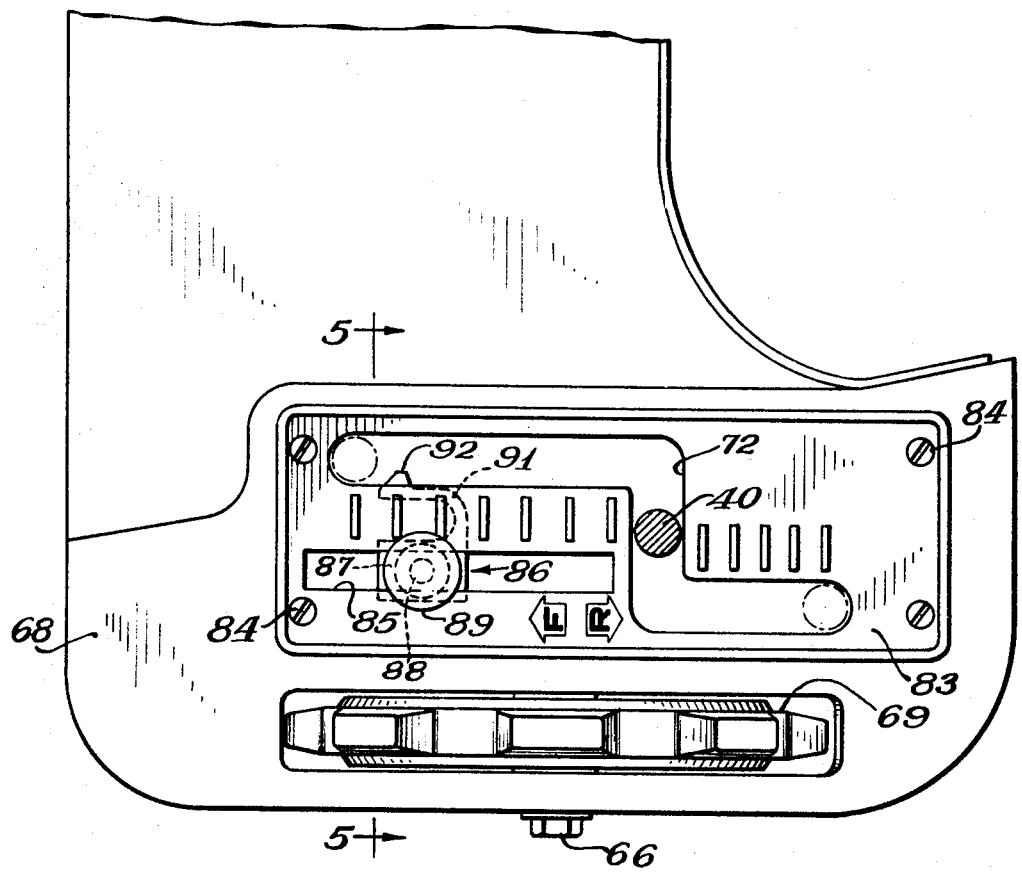
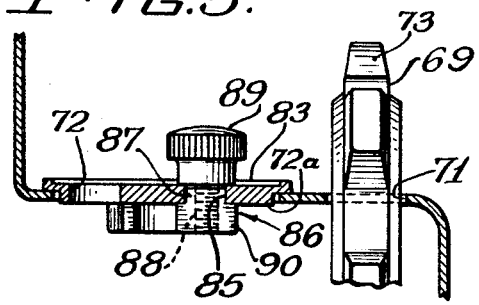

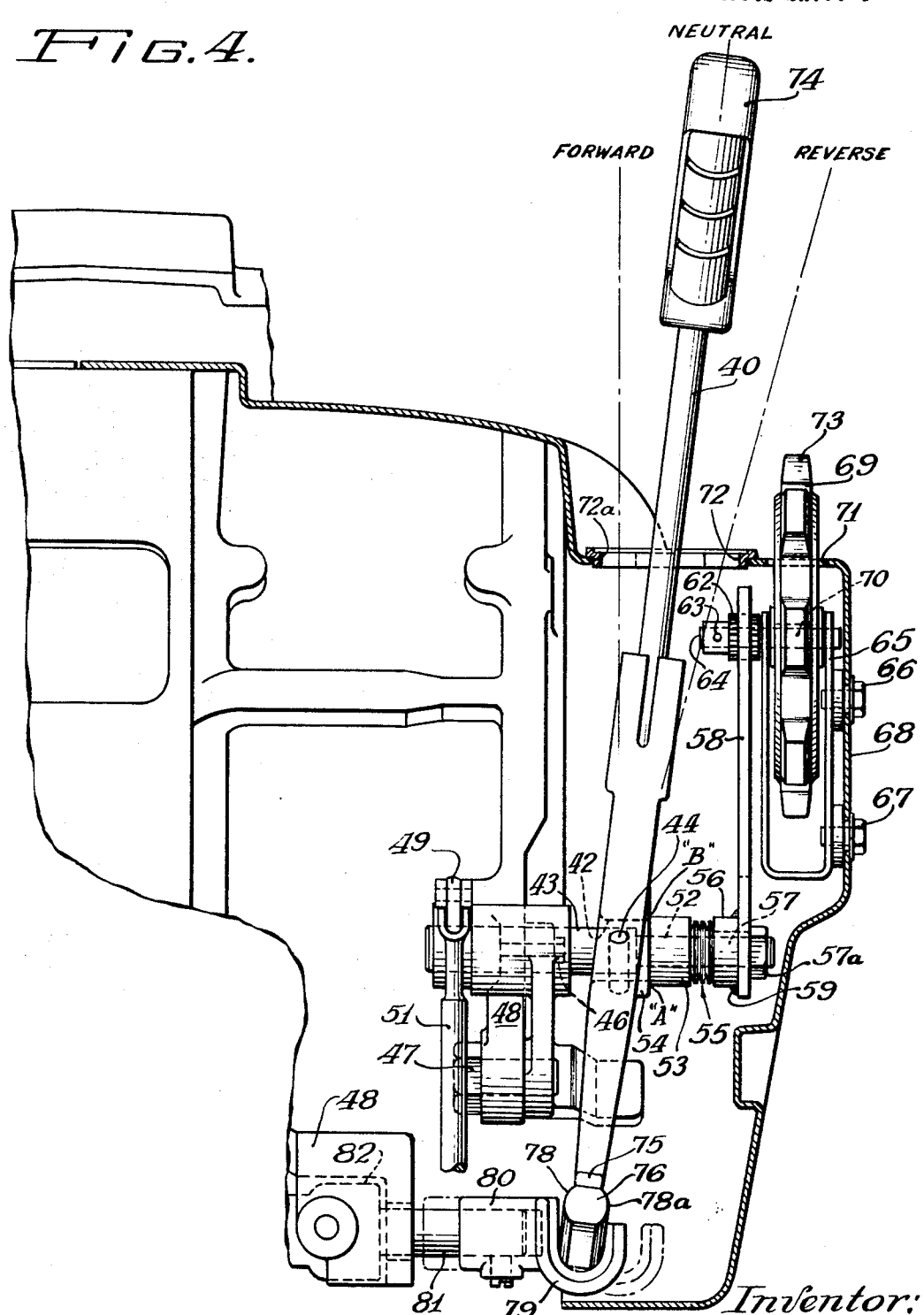

3,392,526
CONTROL MECHANISM
David T. Kataoka, Berwyn, Ill., assignor to International Harvester Company, Chicago, Ill., a corporation of Delaware
Filed Oct. 11, 1966, Ser. No. 585,787
11 Claims. (Cl. 60—53)

ABSTRACT OF THE DISCLOSURE

In combination with a reversible hydrostatic transmission having a reversible variable displacement swash plate pump, a reversible variable displacement swash plate motor, and expandable and contractible servo mechanisms connected to the respective pump and motor wash plates for operation thereof including displacement control means pivotally movable in opposite directions from a neutral center position and operative for independently controlling displacement of the pump and displacement of the motor on movement in either direction from the neutral center position thereof, and a hydraulic value displaceable in opposite directions from a neutral center position, the combination therewith of operable control means connected to said displacement control means and including an operating lever pivotally mounted on a support and rotatable in opposite directions from a neutral center position and operative for translating control movements of an operator to said displacement control means, and vernier adjustable means connected to said operating lever and operative for imparting small increments of control movement to said operating lever, and valve actuating means mounted for rockable movement in a plane along the longitudinal axis of rotation of said operating lever and operative responsive to movements of said operating lever in the neutral center position thereof for conditioning said hydraulic valve into oppositely displaceable operating positions thereof.

---

This invention relates to control mechanisms and particularly to mechanisms operable for controlling the speed and direction of rotation of the power output of a hydraulic device. More specifically however, it is directed to a control mechanism of the type capable of being operated to perform multiple functions such, for instance, as to effect small as well as large increments of control movement of the speed control component of a hydrostatic transmission, control the direction of rotation of the output thereof, and condition a hydraulic valve for each of the operating positions thereof.

In hydrostatic transmission units it is common practice to control the speed and direction of rotation of the output shaft thereof by rotatably displacing or tilting one or both of the swash plates associated with the hydraulic pump and motor components of the unit. The degree of tilt, as is well known, determines the amount of fluid displaced by the pump into the motor component and correspondingly the speed of the motor varies with such displacement. Likewise the direction of rotation is usually controlled as by tilting the swash plates between predetermined positions of one of said swash plates relative to the other thereof. Since the amount of speed control is so directly related to the degree of swash plate tilt precise control of said tilt is critical to good and accurate speed control. In view of this it is highly desirable that such control mechanism be capable of small and positive incremental movements in order to avoid overcontrolling, while at the same time also being capable of a large incremental range of movement in order to effect a rapid acceleration of the transmission when required.

It is a principal object of the present invention, therefore, to provide a novel and improved mechanism operable for effecting infinitely variable increments of movement in a controlled device.

Another object is to provide a unique control mechanism operable for alternatively translating small and large increments of control movements generated by an operator to a controlled device.

A further object is to provide a manually operable lever rotatably and rockably mounted for movement along a gated shift pattern having a generally Z-shaped path and having cooperable therewith a toothed wheel, gear rack and hand wheel mechanism operable for imparting small or vernier-like increments of movement to said lever.

A still further object is to provide a mechanism operable for effecting positive and minute as well as large increments of control movements in the pump-motor unit swash plates of a hydrostatic transmission for accomplishing speed and directional control thereof.

A more general object is to provide a control mechanism including a rotatably and rockably mounted lever rotatable in opposite directions from a neutral center position for imparting small as well as large increments of control movement to a hydrostatic transmission and wherein said control mechanism in its neutral position is rockable in a plane transverse to the direction of rotative movement of the lever for actuating a hydraulic valve to condition the latter for various operating positions thereof.

The foregoing and other objects and features of the invention will become apparent as the disclosure is more fully made in the following detailed description of a preferred embodiment of the invention as illustrated in the accompanying sheets of drawings in which:

FIGURE 1 is a somewhat schematic representation showing one preferred application of the proposed invention;

FIGURE 2 is a vertical elevational view of the proposed control mechanism, portions of the covering structure thereof being cut away to more clearly illustrate the structure thereof;

FIGURE 3 is a top plan view of portions of the mechanism shown in the preceding view;

FIGURE 4 is a vertical elevational front view of the mechanism of the preceding views with portions thereof either schematically represented or shown in cross-section, the view being taken at an angle rotated 90° from that of FIGURE 2; and FIGURE 5 is a fragmentary vertical sectional view taken generally along the line 5—5 of FIGURE 3.

A preferred application of the present invention, as illustrated in the accompanying drawings, contemplates its use with a hydrostatic transmission of the type occasionally employed as part of the drive train incorporated between the prime mover and propulsion wheels of a vehicle. Since the structural features of the vehicle and its components may be generally conventional they have been omitted from inclusion herein.

Referring now to the drawings it will be seen a hydrostatic transmission unit, represented generally by the reference numeral 10, includes a variable displacement reversible pump 11 having a pivotally mounted swash plate 12 rotatable in opposite directions from a central neutral position for varying displacement of the pump, and a variable displacement reversible motor 13 having a pivotally mounted swash plate 14 rotatable for varying displacement of said motor, all as is well understood. Power input to the pump may be effected through a shaft such as 15 operably connected to a suitable power means (not shown), while the output of motor 13 may be operatively coupled by a shaft 16 to the component or device receiving said output, such for instance as the drive wheels of a vehicle (not shown). Inlet and outlet fluid connections 17, 18 communicatively connect said unit with a source of fluid pressure such as a conventional hydraulic system (not shown) in accordance with well-known practices. It will be understood suitable mounting and support means will be provided for the pump-motor unit but since the details thereof are not pertinent to the proposed invention no showing thereof is believed necessary herein.

The swash plates 12 and 14 are connected to the respective hydraulically actuated extendible and contractible servo cylinders 19, 20 by suitable linkage means such as schematically represented at 21, 22 while said cylinders may be suitably anchored by means not shown on a support 23 constituted as a portion of the transmission housing of the vehicle when so employed. A shaft 24 suitably journalled and carried by the support 23 has an actuating lever arm 25 mounted thereon and constrained for rotation therewith that may be connected to suitable actuating means as hereinafter noted. Since mechanisms of the character referred to for operably rotating swash plates to control displacement of associated pump and motor units are so well known, as evidenced by the U.S. Patent No. 3,126,707 to N. N. Hann et al., further detailing of the construction thereof is believed unnecessary.

Control of the servo cylinders 19, 20 may be effected through a cam plate 26 suitably mounted on shaft 24 and constrained for rotation therewith and having valve porting slots such as 27, 28, 29, and a guide slot 30 therein. Said valve porting slots cooperate with valve port openings 31, 32 in the respective servo cylinders 19, 20, and guide slot 30 with a follower pin 33 mounted on cylinder 19 to effect operative control of said cylinders. A pair of scissor-like operating levers 34, 34a suitably rotatably mounted on shaft 24 are connected together at their opposite ends by a spring 35, while a stud 36 mounted in the cam plate and a stud 37 mounted in support 23 may cooperate with respective recesses 38, 38a and shoulder abutments, 39, 39a in the said levers to controllably limit the rotative movements thereof. Since the structural features and operating characteristics of the foregoing cam plate and its centering mechanism all of which may be termed a displacement control means are more completely disclosed and claimed in the copending U.S. patent application Ser. No. 562,611, filed July 5, 1966, now Patent No. 3,374,626, reference may be had thereto for additional details of the construction thereof.

Now in accordance with the more specific teachings of the invention proposed herein there is provided a control mechanism, connected by linkage means to the cam plate actuating lever arm 25, that is operable for translating small as well as large increments of control movement generated by an operator to the swash plates of a pump-motor component to effectuate speed and directional control of the output of an associated hydrostatic transmission, with said mechanism additionally being selectively operable in the neutral position or dwell area thereof for actuating or setting up the operating positions of a hydraulic valve incorporated in the associated hydraulic system of said transmission.

An operating hand lever 40 includes an enlarged hub-like portion 41 having a somewhat elliptical-shaped aperture 42 extending through the lever intermediate the ends thereof. A shaft 43 extends through the elliptical aperture 42 and a transversely extending pin 44 secures said lever to the shaft and constrains it for rotation therewith. One end of shaft 43 is journalled in a generally triangularly shaped bracket 45 which, in turn, is mounted by fastening means such as the bolts or cap screws 46, 47 on a fixed support such as 48. The fixed support 48 which is shown somewhat fragmentarily in the drawings may be constituted as a portion of a steering support means for the associated vehicle. It will be understood, of course, suitable means not shown will be provided for mounting said support on the frame or chassis of the vehicle, but since the construction features may be conventional the details thereof are otherwise not pertinent to a full understanding of the present invention, hence such details are not included herein.

An outwardly projecting end of shaft 43 has an arm 49 mounted thereon and secured thereto by suitable means such as the pin 50 so that said arm is constrained for rotation with said shaft. A connecting link or linkage assembly 51 is pivotally attached to one end of arm 49 while the opposite end of said linkage is pivotally connected to the free end of the actuating lever arm 25 for operation of cam plate 26 and its associated assembly. While the preferred form of the linkage 51 is illustrated as a rigid rod or link-like member it will be appreciated that other forms of push-pull linkage means such, for instance, as the well known "Bowden" type cable may be used without deviating from any of the teachings hereof.

The end of shaft 43 opposite that journalling said shaft is fashioned with a reduced section portion 52 that rotatably receives a transverse thrust spacer block 53 disposed in abutting relation with a boss 54 on the operating lever 40. The opposite end of said spacer block abuttingly engages a plurality of resilient discs, such as the "Belleville" type spring or compression washers indicated generally at 55, compressibly disposed between the latter block and a hub-like portion or collar 56 mounted on the reduced shaft portion 52 and constrained for rotation with the shaft by suitable means such as the key 57.

A generally triangularly-shaped quadrant sector member 58, affixed to hub 56 by suitable means such as the welds indicated at 59, is also constrained for rotation with shaft 43 by virtue of the functioning of key 57 and retained against displacement therefrom by suitable means such as the nut 57a. A connecting arc portion 60 of said sector has the inner arcuately shaped face thereof fashioned with a gear rack 61 that is disposed in continuous engagement with a pinion gear 62 suitably affixed by a pin 63 to a spindle or shaft 64. The shaft 64 is suitably journalled in opposite legs of a U-shaped bracket 65 detachably affixed by suitable means such as the cap screws 66, 67 to a fixed support such as 68. The latter support may be constituted as a portion of a housing covering the steering support means heretofore mentioned in connection with fixed support 48, and will, of course, be suitably carried by the vehicle chassis or frame. A star wheel 69 disposed between the opposite legs of bracket 65 is mounted for movement with shaft 64 by suitable means such as the key 70. An opening 71 in support housing 68 permits extension therethrough of the wheel 69, and a generally Z-shaped slot-like opening 72 in an escutcheon plate 83 positioned in an opening 72a in said housing slidably accommodates lever 40 for movement along a gated shift pattern or path defined by said slot-like opening. Peripherally spaced projectors such as 73 on the wheel 69 provide means to facilitate manual movement thereof, while a handle 74 on lever 40 facilitates the movement thereof.

The end of lever 40 opposite that supporting handle 74 has a flange-like member 75 thereon that carries a block 76 detachably affixed thereto by suitable means such as the countersunk screws 77, and opposite side faces 78, 78a of said block may be generally arcuately shaped on a radius centered along the longitudinal axis thereof, as best seen by reference to FIG. 4. Block 76 is disposed for positioning, in one position of hand lever 40, between opposite surfaces of a claw or hook-like member 79 having a shank portion 80 thereon that may be connected to a spool extension 81 of a hydraulic valve 82 mounted on support 48 by suitable affixing means not shown. It will be seen that when the operating lever 40 is in its neutral position, i.e., in the cross-over or bar portion of the Z-shaped opening 72, it may be rocked on its mounting pin 44 to effect movement of the spool extension 81 of valve 82 between positions disposed on opposite sides of a neutral center position thereof. Since the Z-shaped slot-like opening 72 prevents rocking of the lever 40 except in the neutral cross-over or bar portion thereof it will be appreciated that valve 82 can be moved into its various actuated positions only when lever 40 is in its neutral control position i.e., one corresponding to the neutral position of the swash plates of the pump-motor unit of the transmission. Referring to FIGURE 2 it will be seen that the block 76 will be out of position to engage the hook-like member 79 when the lever 40 is in either of its operating positions displaced from its central neutral position, hence valve 82 can only be actuated with lever 40 in a neutral center position. While valve 82 has been illustrated only fragmentarily in a somewhat schematic form it will be appreciated that any conventional slidably operated spool-type hydraulic valve slidably displaceable in opposite directions from a neutral position may be utilized for the purpose hence it was felt no further showing of the construction thereof was necessary herein. One valve of the type that is suitable for use in the instant application is described in a copending U.S. application Ser. No. 585,902, filed Oct. 11, 1966 in the names of William C. Swanson, Donald W. Moyer and Roger Asmus and assigned to the same assignee as this invention.

Escutcheon plate 83 with its generally Z-shaped slotted opening 72 is disposed to overlie the opening 72a in housing 68 and may be affixed to said housing by suitable means such as the fastening screws 84. An additional slotted opening 85 in said plate is provided to position therein a stop or detent member indicated generally by the reference numeral 86. Said stop or detent member may be fashioned with a stud portion 87 dimensioned for projection into and slidable movement within slot 85. A threaded insert 88 affixed in said stud portion threadably receives the threaded shank of a button-like member or knurled knob 89 which may be tightened to fixedly position the stop member or loosened to permit repositioning of the stop at various positions throughout the length of slot 85. The body 90 of said stop member has a curved arm 91 extending outwardly therefrom that has a small tip or ridge-like projection 92 proximate the outer end thereof that projects into the area beneath a portion of the slot 72 for contacting engagement with the lever 40. The stop or detent member is fashioned of a suitable resilient material that is yieldable to permit the lever 40 to momentarily override the stopping or detent action thereof when desired without resetting the position of the stop. While any one of many suitable yieldable materials may be used a material that has been found to be highly effective for such a yieldable stop member is a plastic of the Delrin, acetal resin type, a product of the Du Pont Company, Wilmington, Del. When the use of the stop or detent is not desired it may be moved along to the end of its associated slot where it will be retained out of the way till further use thereof is desired.

*Operation*

When the handle 74 is pushed forward (to the left in FIGURE 2) the shaft 43 is rotated counterclockwise carrying with it the linkage assembly 51 which thereupon translates such movement to the cam plate 26 to signal the transmission to impart forward motion by tilting the swash plates to effect such movement. As handle 74 is pushed rearward (rightwardly in FIGURE 2) the shaft is rotated clockwise carrying linkage 51 with it and causing such action to impart a reverse movement signal to the transmission. The cross-over or bar portion of the Z-shift pattern represents or establishes the neutral zone or neutral dwell area.

When the handle 74 is moved leftwardly (as viewed in FIGURE 4) about the pivot pin 44 through the neutral zone or the bar portion of the Z-shaped path the lever 40 contacts the slidable spacer block 53 at a point such as A forcing said block to compress the spring washers 55, thus having the washers serve to function as a neutral detent means. Concurrently block 76, attached to the lower end of lever 40, engages the hook member 79 to move the associated valve 82 out of its neutral position and extend it to one of its operating positions. Conversely when handle 74 is moved rightwardly (as viewed in FIGURE 4) through the neutral zone of the shift pattern the lever 40 contacts the slidable spacer block 53 at a point such as B forcing said block to again compress the spring washers 55 and again function as a neutral detent means. Concurrent with this latter movement block 76 engages hook member 79 to move the valve 82 away from its neutral and pushing it in an opposite direction into another one of its operating positions.

It will be appreciated that as handle 74 is moved forwardly or rearwardly from its neutral position the block 76 becomes disengaged from the hook member 79 thus leaving valve 82 positioned in its corresponding then attained forward or reverse operating positions.

From the foregoing it will be apparent that the proposed device provides a control mechanism that is adaptable for translating small as well as large increments of control movement from an operator to a controlled device, and is selectively operable in certain positions thereof for setting up or triggering the operation of an associated hydraulic valve into the various actuating positions thereof, and which, additionally, includes overridable detent means to permit an operating lever to be returned to a preselected operating setting but being overridable without disturbing the preset position of the detent.

Although only a preferred form of the invention has been illustrated, and that form described in detail, it will be apparent to those skilled in the art that various modifications may be made therein without departing from the spirit of the invention or from the scope of the appended claims.

What is claimed is:

1. In a reversible hydrostatic transmission having a reversible variable displacement swash plate pump, a reversible variable displacement swash plate motor, and expandable and contractible servo mechanisms connected to the respective pump and motor swash plates for operation thereof including displacement control means pivotally movable in opposite directions from a neutral center position and operative for independently controlling displacement of the pump and displacement of the motor on movement in either direction from the neutral center position thereof, and a hydraulic valve displaceable in opposite directions from a neutral center position, the combination therewith, comprising: operable control means connected to said displacement control means and including an operating lever pivotally mounted on a support and rotatable in opposite directions from a neutral center position and operative for translating control movements of an operator to said displacement control means, and vernier adjustable means connected to said operating lever and operative for imparting small increments of control movement to said operating lever, and valve actuating means mounted for rockable movement in a plane along the longitudinal axis of rotation of said operating lever and operative responsive to movements of said operating lever in the neutral center position thereof for conditioning said hydraulic valve into oppositely displaceable operating positions thereof.

2. The invention according to claim 1 but further characterized in that said operating lever is mounted intermediate the ends thereof on a shaft and constrained for rotation therewith and with said lever being additionally mounted for rockable movement on an axis transverse to the axis of rotation of said shaft, and having gated guide means associated with said lever fashioned to provide a substantially Z-shaped path along which said lever is movable.

3. The invention according to claim 2 but further characterized in that said gated guide means has associated therewith a resilient element having a ridge thereon projecting into and movable along a portion of said Z-shaped path, and adjustable attaching means operable for selectively positioning said element in any one of a plurality of positions along the said portion of said path, said element being positioned so that normally the ridge thereon engages with and limits the movement of said operating lever but being yieldable to permit overriding of said limiting movement by an increase of the force exerted upon said lever.

4. The invention according to claim 3 wherein the resilient element is fashioned from a Delrin, acetal resin material.

5. The structure defined in claim 1 but further characterized in that said vernier adjustable means includes a gear rack portion formed on a quadrant sector member mounted on said shaft and constrained for rotation therewith, a pinion gear rotatably mounted on a fixed support and disposed for continuous meshing engagement with said gear rack, and a manually operable wheel member mounted proximate said pinion gear and constrained for rotation therewith.

6. The structure defined in claim 5 and further characterized in that said shaft is mounted on a fixed support and has an operating arm mounted thereon and constrained for rotation therewith, and in that push-pull linkage operatively connects said operating arm with said displacement control means.

7. The invention according to claim 2 but further characterized in that said valve actuating means includes an extension of said operating lever having an abutment member on the end thereof engageable with a hook-like member adapted for connection to said hydraulic valve, said abutment being disposed for engagement with said hook-like member to effect displacement thereof only when said operating lever is rockably moved around an axis transverse to the axis of rotation of said shaft.

8. A control mechanism for effecting positive and minute as well as large increments of control movements to a controlled device, comprising a motion-transmitting lever rotatably mounted for displacement in opposite directions from a neutral center position and adapted for connection to a controlled device; and an infinitely variable means transversely attached to said lever and manually operative for imparting small increments of movement to said lever.

9. The structure defined in claim 8 wherein said lever is additionally mounted for rockable movement on an axis transverse to the axis of rotation thereof with said lever being so rockable only when said lever is disposed in the neutral center position thereof.

10. The invention according to claim 8 and further characterized in that said infinitely variable device includes a quadrant sector constrained for rotation with said lever and having a toothed portion of said quadrant sector disposed in continuous meshing engagement with a pinion gear manually operative for imparting small increments of movement to said lever.

11. The structure defined in claim 5 but further characterized in that said quadrant sector member is axially spaced from said lever with spacer means including one or more spring washers circumscribing said shaft disposed in reactively abutting relation between said spacer means and said quadrant sector to provide continuous lateral thrust against said lever.

References Cited
UNITED STATES PATENTS

| | | | |
|---|---|---|---|
| 2,189,823 | 2/1940 | Vickers et al. | 60—53 |
| 3,172,262 | 3/1965 | Jonkers et al. | 60—53 |

EDGAR W. GEOGHEGAN, *Primary Examiner.*